April 5, 1927.  1,623,589

J. D. GRANATH

INTERNAL COMBUSTION ENGINE

Filed March 5, 1926   4 Sheets-Sheet 1

INVENTOR:
Joseph D. Granath
BY
ATTORNEY.

INVENTOR:
Joseph D. Granath
BY
E J Andrews
ATTORNEY.

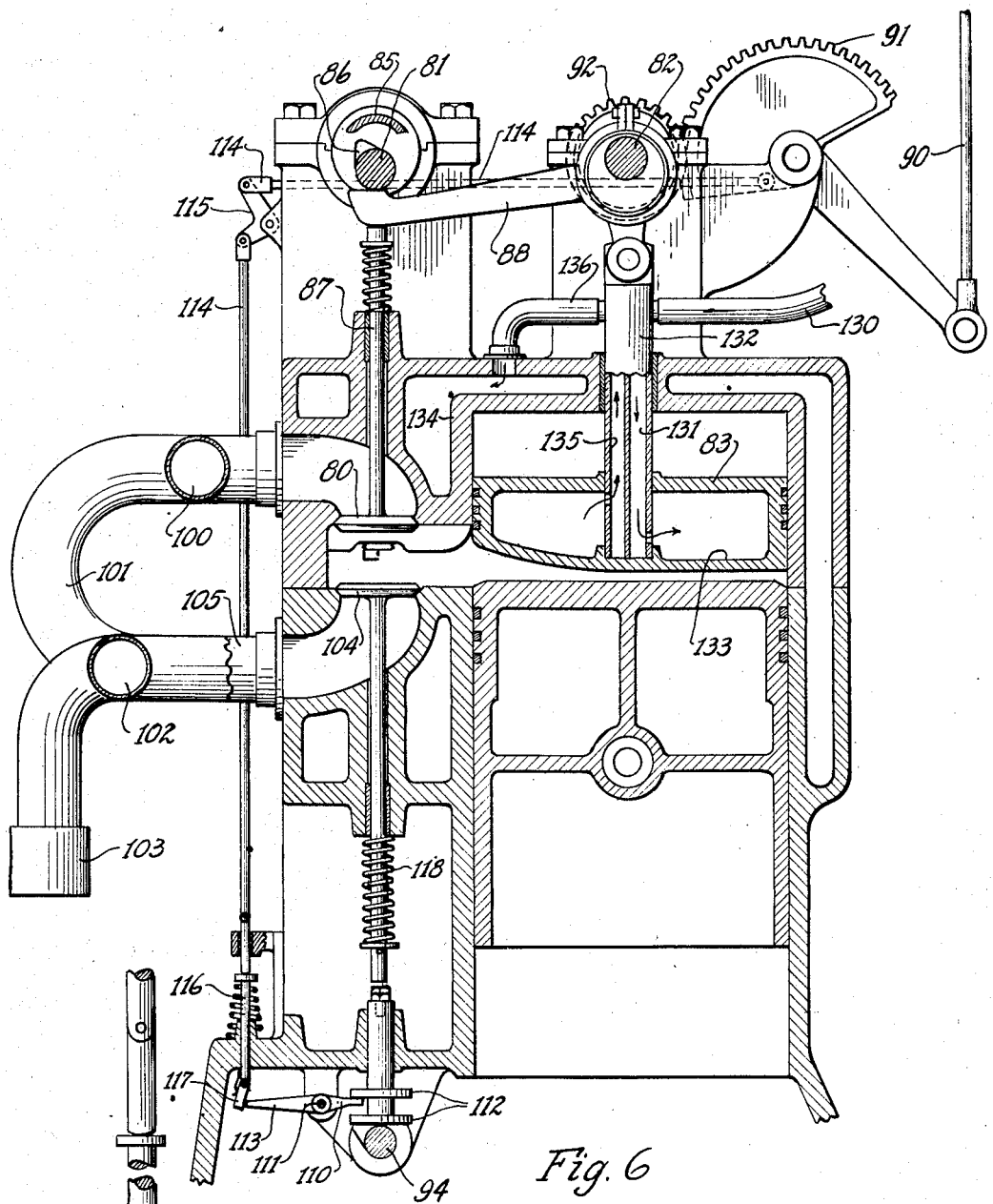

April 5, 1927.  J. D. GRANATH  1,623,589
INTERNAL COMBUSTION ENGINE
Filed March 5, 1926    4 Sheets-Sheet 4

INVENTOR:
Joseph D. Granath
BY E. J. Andrews
ATTORNEY.

Patented Apr. 5, 1927.

1,623,589

UNITED STATES PATENT OFFICE.

JOSEPH D. GRANATH, OF CHICAGO, ILLINOIS.

INTERNAL-COMBUSTION ENGINE.

Application filed March 5, 1926. Serial No. 92,423.

This invention relates to internal combustion engines, and has for one of its objects providing means for releasing the compression, or decreasing the amount of the combustible gas in the cylinders of the engine, in certain conditions which make this desirable. It has for a further object providing means for varying the clearance between the piston and the head of the cylinder when the compression is produced, and particularly to vary this space when the amount of gas to be compressed is varied by the means provided. It has for a further object suitable means for carrying out these changes in the arrangement and operation of the engine, and other objects of the invention will be apparent from a consideration of the accompanying drawings and the following description thereof.

Figures 1, 2, 3:
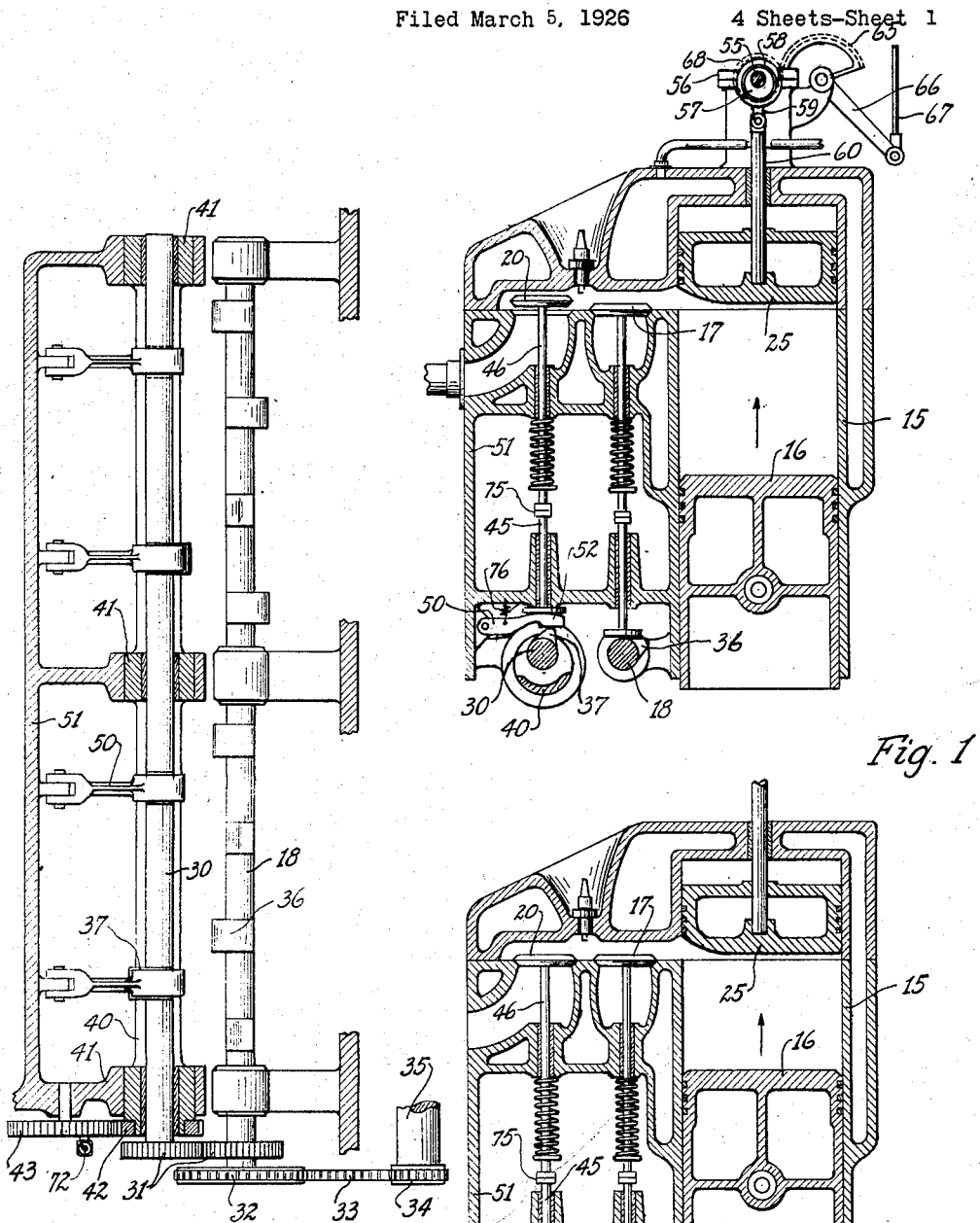
Figure 4:
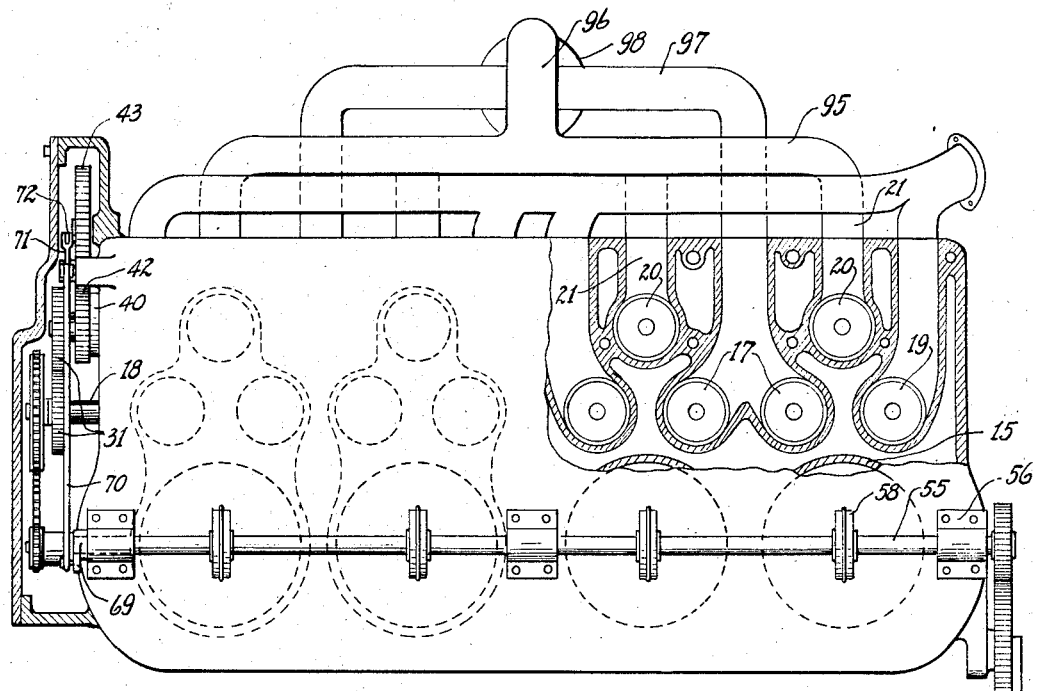
Figure 5:
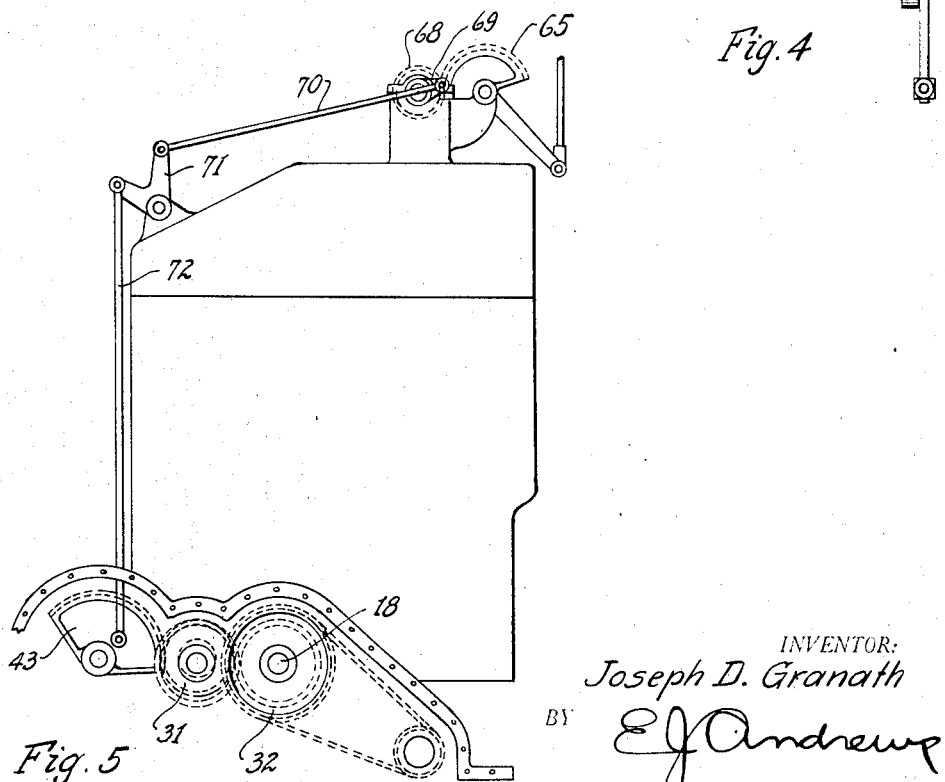
Figure 8:
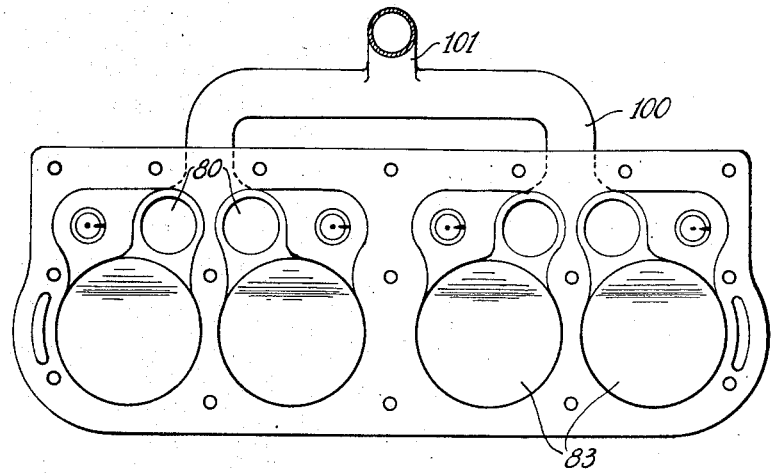
Figure 9:
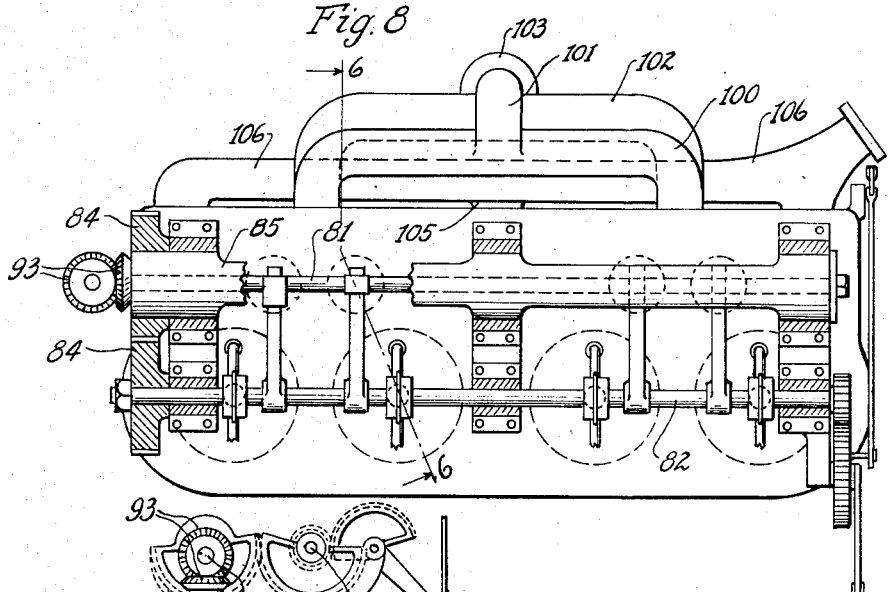
Figure 10:
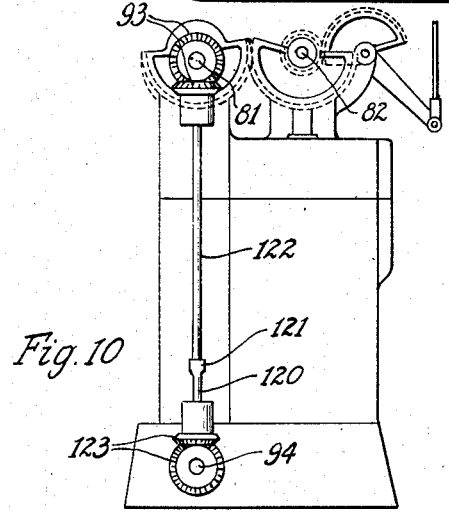
Figure 11:
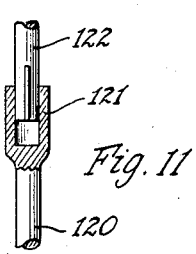

Of the drawings Fig. 1 is a vertical sectional view of an engine which embodies features of my invention, showing the position of the piston and the gas release valve at a certain point in the cycle; Fig. 2 is a corresponding view showing the piston and valve at another point in the cycle; Fig. 3 is a plan view of the cam shafts for operating the valves of the engine; Fig. 4 is a plan view of the engine with certain parts of the cover broken away; Fig. 5 is an end elevation of the engine; Fig. 6 is an enlarged, vertical sectional view of a modified type of engine; Fig. 7 is an enlarged detail view of a portion of one of the elements; Fig. 8 is a reduced bottom view of the head of the modified engine casing; Fig. 9 is a plan view of the modified engine; Fig. 10 is a reduced end elevation of the modified engine; and Fig. 11 is an enlarged detail view of a portion of one of the elements.

The engine which I use to illustrate my invention may represent any type of internal combustion engine, such as is used for automobile or similar purposes, and it comprises a set of cylinders 15 in which operate pistons 16. The engine includes also ordinary intake valves 17, operated by a cam shaft 18 in an ordinary manner, together with the ordinary exhaust valves 19, Fig. 4. These various elements are all standard so far as my invention is concerned, and are in no way materially affected thereby. I apply to the engine, however, compression relief valves 20 which are opened at proper times so as to relieve the compression of the combustible gas in the cylinder.

It is often desirable, when starting the engine, and particularly when accelerating the automobile, to have a maximum amount of gas in the cylinder when the explosion occurs, so as to obtain a maximum amount of power. But when the acceleration is finished and uniform speed is desired, much less power is required to operate the engine: and it then becomes desirable to decrease the amount of gas which is exploded at each cycle. To accomplish this I provide a relief valve 20 for each cylinder which, as indicated, is opened about the time the piston begins to make the compression stroke. Normally this relief valve is held open by suitable means until such portion of the stroke has been made as will eject from the cylinder so much gas as may be desired. In practice, when the piston has completed about one-half of its stroke, as indicated in Fig. 2, the relief valve is closed, and the gas remaining in the cylinder is then compressed in the ordinary manner and exploded. In this way about one-half of the gas is forced out of the cylinder and the remaining one-half is exploded and gives sufficient power to maintain the uniform speed. The expelled gas is passed back into the intake manfold as hereinafter explained.

In order to maintain substantially maximum compression with this reduced amount of gas I provide means for decreasing the clearance or the compression space between the piston and the cylinder head. Any suitable means may be provided for this, but I prefer for the purpose the use of an auxiliary piston 25 which forms the effective head of the cylinder, and which is movable therein. When it is desired to decrease the clearance because of the reduction in gas used this piston is moved downwardly, by suitable means, so as to reduce the compression space so much as may be desired to maintain the most efficient amount of compression. It will thus be seen that, when less power is required, the operator or driver of the car may, by operating suitable mechanism, bring into play the relief valve 20 and also move downwardly the head 25 of the cylinder, so as to simultaneously reduce the amount of gas consumed and the amount of compression space, and thus to conserve the gas and at the same time maintain the proper compression.

Any suitable means may be provided for operating the relief valve and varying the clearance. I prefer for the purpose of operating the relief valve a cam shaft 30 which may be geared to the cam shaft 18 by gears 31 so as to operate at the same speed, it being understood that the shaft 18 is operated in the ordinary manner. For example, by means of a sprocket wheel 32 connected by a chain 33 to a wheel 34 on the driving shaft 35 of the engine, the arrangement being such that each of the cam shafts 18 and 30 make a complete rotation for two rotations of the driving shaft. Mounted upon these cam shafts are suitable cams 36 for operating the intake valves 17, while the cams 37 operate the relief valves 20.

Inasmuch as it is not desired to have the relief valves operate at all times, means are provided for throwing the relief valve mechanism out of operation when more power is required, as in starting, and particularly when accelerating the engine or climbing hills. The means which I provide for throwing the cam shaft 30 out of operation comprises an eccentric tube 40, which is mounted in bearings 41 and has fixed to it at one end a gear wheel 42, which is operated by another segment 43. The shaft 30 is rotatably but eccentrically mounted in the tube 40, so that, as the tube is rotated, the shaft 30 will be raised or lowered. If it is desired to set the relief valves in operation the tube 40 is rotated to elevate the shaft 30 and bring the cams 37 into co-action with the tappets 45 which operate, in an ordinary manner, the valves 20, by means of the stems 46.

The tube 40 is operated as hereinafter described. It will be understood that the tube extends from one end to the other of the shaft 30, and that the entire shaft is raised as the tube is rotated, and the various cams 37 are thus brought simultaneously into co-action with their respective valves. As the shaft 30 is raised or lowered by the eccentric tube, the shaft is moved somewhat further from the shaft 18, but not sufficiently to throw the gears 31 out of mesh.

In order to more properly operate the tappets 45, I provide arms 50 which are pivoted at one end to the frame 51 of the engine, and the other end of the arms are positioned between the lower ends of the tappets 45 and the shaft 30 so as to come into co-action with the cams 37, and thus to operate the tappets. This arrangement prevents side thrusts on the bottom of the tappets, and also allows for more convenient timing of the valves.

In order to operate the cylinder heads 25 when desired, I provide a cam shaft 55 which is mounted in bearings 56 above the ends of the cylinders. Non-rotatably and eccentrically mounted on the shaft are cams 57. These cams are encircled by sleeves 58 to which are fixed arms 59. As the shaft 55 is rotated the sleeves 58 are raised or lowered, carrying with them the arms 59 and thus the stems 60, together with the pistons 25. So that by rotating the shaft 55 all of the pistons or cylinder heads 25 are elevated or lowered as the case may be. In order to maintain the heads in their lowered or elevated positions the eccentric arrangement is such that the shaft 55 is in a position of dead center when the head is at the minimum or maximum elevation. By this arrangement the explosion is ineffective in forcing the piston head higher when the compression space is reduced to the minimum.

In order to conveniently operate the shafts 55 and 30 when it is desired, I provide a segmental gear 65 which is mounted in bearings on the frame of the machine and may be operated by means of an arm 66 and a link 67, the link extending to the steering wheel of the machine, or wherever desired. The segment 65 meshes with the wheel 68 which is fixed to the shaft 55. When the link 67 is pulled the shaft 55 is, therefore, raised or lowered, to operate the piston head 25.

On the front end of the shaft 55 is an arm 69, Fig. 4, to which is pivoted one end of a link 70. This link is adapted to operate a bell crank 71, and thus to raise and lower a link 72, when the segment 65 is operated. The link 72 is pivoted to the segment 43 and rotates this segment through substantially 90° when the piston head 25 is raised or lowered the maximum amount. The rotation of the segment 43 thus operates, by means of the wheel 42, the eccentric tube 40 through 180° and hence raises or lowers the shaft 30 the maximum amount and renders it operative or inoperative. It will be understood that the shaft 30 is at all times in operative connection with the shaft 18, and continuously operates at the same speed by virtue of the gears 31; but when the shaft 30 is lowered, the stops 75 prevent lowering of the tappets 45 sufficiently to be affected by the shaft 30. Springs 76 hold the arms 50 out of operative relation to the cams 36 when the shaft 30 is lowered, and also the upper side of the tube 40 passes under the outer ends of the arms 50 when the shaft 30 is lowered.

In case of the engine illustrated in Figs. 1 to 5 the intake, exhaust, and relief valves are mounted as indicated in Fig. 4, all in substantially the same plane; but it is sometimes desirable to mount the relief valve above the exhaust and intake valves and facing downwardly, as indicated in Fig. 6. In such a case the shaft 81 for operating the relief valves 80 may be mounted above the engine and parallel with the shaft 82 which operates the cylinder heads 83. When so arranged the two shafts are connected by means of gear segments 84, so that, when the shaft 82 is operated to lower the cylinder heads the shaft 81 will be operated by means of the eccentric tube 85, so as to bring the shaft 81 and the cams 86 down into operative relation with the tappets or valve stems 87. In this instance the arms 88, pivoted to the shaft 82, are arranged to project between the cams 86, and the upper ends of the stems 87, corresponding to the arrangement of the arms 50.

Thus it will be seen that, when the driver of the car desires to reduce the amount of power, by pulling on the link 90 he operates the segment 91 and this, in turn, by means of the wheel 92, lowers the shaft 82, and the cylinder heads 93; and, at the same time, by means of the segments 84, the shaft 81 is lowered to operate the relief valves 80. The shaft 81, by means of the bevelled gears 93 and 123, is, at all times, operated at the same speed as the shaft 94 which operates the intake and exhaust valves.

In both of these types of engines I arrange to pass the gas which is released from the cylinder back into the intake manifold. In case of Fig. 4 the release valves 20 allow the released gas to pass into the passageways 21 and then into the release manifold 95, and from that through the conduit 96, into the intake manifold 97 which is connected with the carburetor 98. In case of Fig. 6 the released gas passes into the manifold 100, then through a connecting pipe 101 into the intake manifold 102, which is connected with the carburetor 103. The exhaust gas, which is liberated by the valves 104, passes through the conduit 105 into the exhaust manifold 106.

In the operation of the mechanism to lower the cylinder heads it sometimes happens that one of the release valves is not opened in time when the head is first lowered and compression of the maximum amount of gas in the reduced space takes place, and for this reason it becomes desirable to open the release valve temporarily independently of the ordinary release valve operating mechanism. To accomplish this I provide a finger 110 for each of the tappets of the exhaust valves. These fingers are fixed to a common shaft 111 and project inwardly between the annular flanges 112 fixed to the tappets. When the cylinder head is lowered the shaft 111 is rotated so as to elevate the tappets by means of the upper flanges 112. To operate the shaft 111 I provide an arm 113 fixed to the shaft, and, by means of connecting links 114, one of which is pivoted eccentrically to the segment 91, and a lever 115, the slidably mounted pin 116 is forced downwardly against the outer end of the arm 113 to rotate the shaft 111 and to open temporarily the release valves. When the pin 116 is forced downwardly sufficiently a pivoted member 117, at the lower end of the pin, slips off of the arm 113 and allows the springs 118 to force the exhaust valve tappets downwardly to their normal positions for operation by means of the cam shaft 94. The member 117 is pivoted to the lower end of the pin 116, and a spring 119 resiliently holds it normally in line with the pin.

In raising and lowering the shaft 81 the distance between the centers of this shaft and the cam shaft 94 is varied, and to allow for this I provide the connecting rod 120, with a receptacle 121 at its upper end. This receptacle is adapted to slidably but non-rotatably receive the lower end of the rod 122 and thus to operate the gears 123 and hence the shaft 94.

In order to prevent overheating of the cylinder head 83, I provide for water-cooling it. Water may be passed into the hollow head through a flexible tube 130; and the passageway 131 in the stem 132 of the head. The water then may be circulated in the chamber of the head and passed into the engine water-jacket chamber through the stem passageway 135 and the flexible tube 136.

I claim as my invention:

In an internal combustion engine an intake valve, an exhaust valve, and a release valve, a shaft for operating said intake and exhaust valves, and a shaft for operating said release valve, and means for operating continuously and at the same speed said two shafts, said shafts being positioned beneath said engine.

In testimony whereof, I hereunto set my hand.

JOSEPH D. GRANATH.